(12) United States Patent
Wang Wu

(10) Patent No.: US 7,543,771 B2
(45) Date of Patent: Jun. 9, 2009

(54) MILL FOR GRINDING EDIBLE PARTICLES

(76) Inventor: Ching Yueh Wang Wu, P.O. Box 90, Tainan City 70499 (TW)

( * ) Notice: Subject to any disclaimer, the term of this patent is extended or adjusted under 35 U.S.C. 154(b) by 89 days.

(21) Appl. No.: 11/862,207

(22) Filed: Sep. 27, 2007

(65) Prior Publication Data

US 2009/0084878 A1    Apr. 2, 2009

(51) Int. Cl.
*A47J 42/04*    (2006.01)
(52) U.S. Cl. .................... 241/169.1; 241/168
(58) Field of Classification Search ............. 241/168, 241/169.1, 93
See application file for complete search history.

(56) References Cited

U.S. PATENT DOCUMENTS

| | | | | |
|---|---|---|---|---|
| 5,562,256 A * | 10/1996 | Wolman et al. | ......... | 241/169.1 |
| 5,785,264 A * | 7/1998 | Yang | ............ | 241/169.1 |
| 5,865,384 A * | 2/1999 | Pai | ............ | 241/93 |
| 6,164,574 A * | 12/2000 | Weibel | ............ | 241/168 |
| 6,550,706 B2 * | 4/2003 | Lee et al. | ............ | 241/169.1 |
| 6,948,672 B2 * | 9/2005 | Herren | ............ | 241/169.1 |
| 7,066,418 B2 * | 6/2006 | Ng | ............ | 241/169.1 |
| 2004/0182958 A1 * | 9/2004 | Herren | ............ | 241/169.1 |
| 2005/0211806 A1 * | 9/2005 | Ng | ............ | 241/169.1 |
| 2006/0006262 A1 * | 1/2006 | Gilberts | ............ | 241/169.1 |
| 2007/0158480 A1 * | 7/2007 | Yao | ............ | 241/169.1 |

* cited by examiner

*Primary Examiner*—Faye Francis

(57) ABSTRACT

A mill for grinding edible particles is composed of a main body, a rotating knob, a shaft, a cover, a grinding base, a grinding block, a rotator, an anti-leaking cover, a ratchet block, a bottom base, an adjustment rotating base and two springs. By means of spiral grinding teeth of the grinding block and the grinding base, edible particles can be ground into powder to drop out of powder outlets of the bottom base while clockwise rotating the rotating knob. After using the mill, the powder outlets can be covered by the anti-leaking cover to prevent the powder from dropping on a table via counterclockwise rotating the rotating knob. And, via rotating the adjustment rotating base, the rotator can be moved up and down to alter the distance between the grinding block and the grinding base for grinding with diverse sizes of powder.

3 Claims, 10 Drawing Sheets

MILL FOR GRINDING EDIBLE PARTICLES

BACKGROUND OF THE INVENTION

1. Field of the Invention

This invention relates to a mill for grinding edible particles, particularly to one able to keep the edible particles ground into powder to drop down from powder outlets by clockwise turning around a rotating knob, preventing the powder from dropping on a table by counterclockwise turning around the rotating knob to close the powder outlets while not using, and obtaining diverse sizes of the powder by altering a distance between a grinding block and a grinding base.

2. Description of the Prior Art

Commonly, as shown in FIG. 1, a conventional mill 1 is mainly provided with a main body 10 having a chamber 100 inside it, a rotator 11 bored with a through hole 110, a shaft 12 installed inside the main body 10 with male threads 120 formed around its upper end, an adjusting knob 13 pivotally positioned on the top of the rotator 11, and a positioning plate 14 inserted inside the rotator 11. The adjusting knob 13 is provided with a threaded hole 130 bored inside it for engaging with the male threads 120 of the shaft 12. A positioning base 15 is set in the bottom of the chamber 100 of the main body 10, provided with plural openings 150. A grinding base 16 is installed at the bottom of the positioning base 15, provided with grinding teeth 160 formed inside it. Installed at the bottom of the shaft 12 inside the grinding base 16 is a grinding block 17 that is provided with plural grinding teeth 170 formed on its outer surface. And, positioned at the bottom of the grinding base 16 is a positioning plate 18, which is fixed with the main body 10 by means of fastening elements 181, provided with plural openings 180. On the grinding block 17 is set with a compression spring 19 having its one end leaned on the bottom of the positioning base 15. Via turning around the adjusting knob 13 to vary the space between the grinding block 17 and the grinding base 16, edible particles such as pepper particles can be ground into finer ones. In using, as the rotator 11 is turned around to synchronously drive the shaft 12 and the grinding block 17 to rotate, the edible particles are to be ground between the grinding teeth 170 of the grinding block 17 and the grinding teeth 160 of the grinding base 16 to become finer ones dropping down through the openings 180 of the positioning plate 18. However, as the mill 1 is put back on a table after using, some ground powder still remained in the main body 10 is to drop on and smear the table. Therefore, the invention has been devised to overcome the defects mentioned above.

SUMMARY OF THE INVENTION

The objective of this invention is to offer a mill for grinding edible particles, able to gain various sizes of powder and prevent powder from dropping on a table.

The main feature of a mill for grinding edible particles of the invention is to include:

a main body provided with a chamber formed inside it, a recessed chamber formed under the chamber, a rotating knob fixed on a top of the main body, a polygonal through hole bored on a top of the rotating knob, a positioning block installed on the top of the rotating knob, and a washer fixed between the rotating knob and the main body;

a shaft installed inside the main body and the rotating knob, the shaft formed as a polygonal bar and provided with two annular locking slots formed in its lower portion for engaging with locking rings;

a cover mounted on the shaft inside the recessed chamber of the main body and provided with a through hole and plural openings, a pair of positioning plates symmetrically extended downward from a wall of the cover with an engaging projection formed thereon respectively, and a spring set at a bottom of the cover to be mounted on the shaft;

a grinding base positioned under the cover and provided with a pair of recessed grooves symmetrically formed around its outer wall, an opening bored in a center of the grinding base, plural slopes formed around an upper inner wall of the opening, and plural spiral grinding teeth formed around a lower inner wall of the opening, a grinding block installed in the opening and bored with a polygonal through hole in its center and formed with plural spiral grinding teeth on its outer surface with a direction opposite to the spiral grinding teeth, a positioning block installed under the grinding block and provided with a polygonal through hole and a recess formed under the polygonal through hole for fitting with a spring;

a rotator installed under the grinding block and provided with a pair of bars symmetrically extended from its outer wall, a through hole bored in a center of the rotator, a recess formed under the through hole, and plural openings formed in the rotator;

an anti-leaking cover installed under the rotator and provided with a pair of covering plates formed symmetrically around its circumference, a through hole bored in a center of the anti-leaking cover, plural ratchets formed around a top surface of the anti-leaking cover, a ratchet block positioned on a top of the anti-leaking cover, the ratchet block formed with plural ratchets around its bottom for corresponding to the ratchets of the anti-leaking cover and bored with a polygonal through hole in its center and extended downward from its bottom with a projection to be fitted in the through hole of the anti-leaking cover;

a bottom base positioned under the cover inside the recessed chamber of the main body and provided with a chamber formed inside it, a pair of projections symmetrically formed around a top edge of the chamber, a pair of notches symmetrically cut around a wall of the bottom base, an annular locking edge formed around an upper outer wall of the bottom base, a through hole and plural powder outlets bored at a bottom of the bottom base, and a pair of blocking strips symmetrically formed at a bottom of the chamber; and an adjustment rotating base fitted with the bottom base and provided with a chamber formed inside it, a locking groove formed in an upper inner wall of the chamber, plural openings formed at a bottom of the chamber, a pair of notches symmetrically cut around a wall of the adjustment rotating base, a plurality of positioning grooves with various levels slantwise formed under each of the notches.

BRIEF DESCRIPTION OF DRAWINGS

This invention is better understood by referring to the accompanying drawings, wherein.

DETAILED DESCRIPTION OF THE PREFERRED EMBODIMENT

Figure 1:
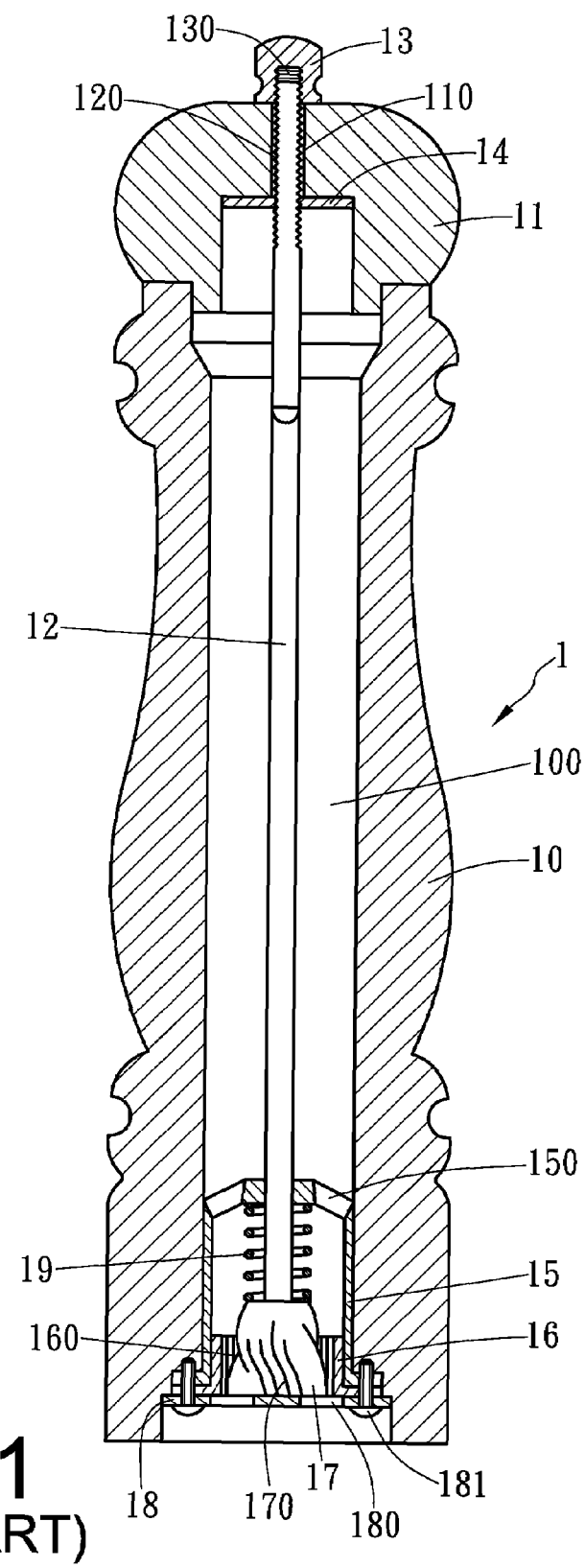
FIG. 1 is a cross-sectional view of a conventional mill.
Figure 2:
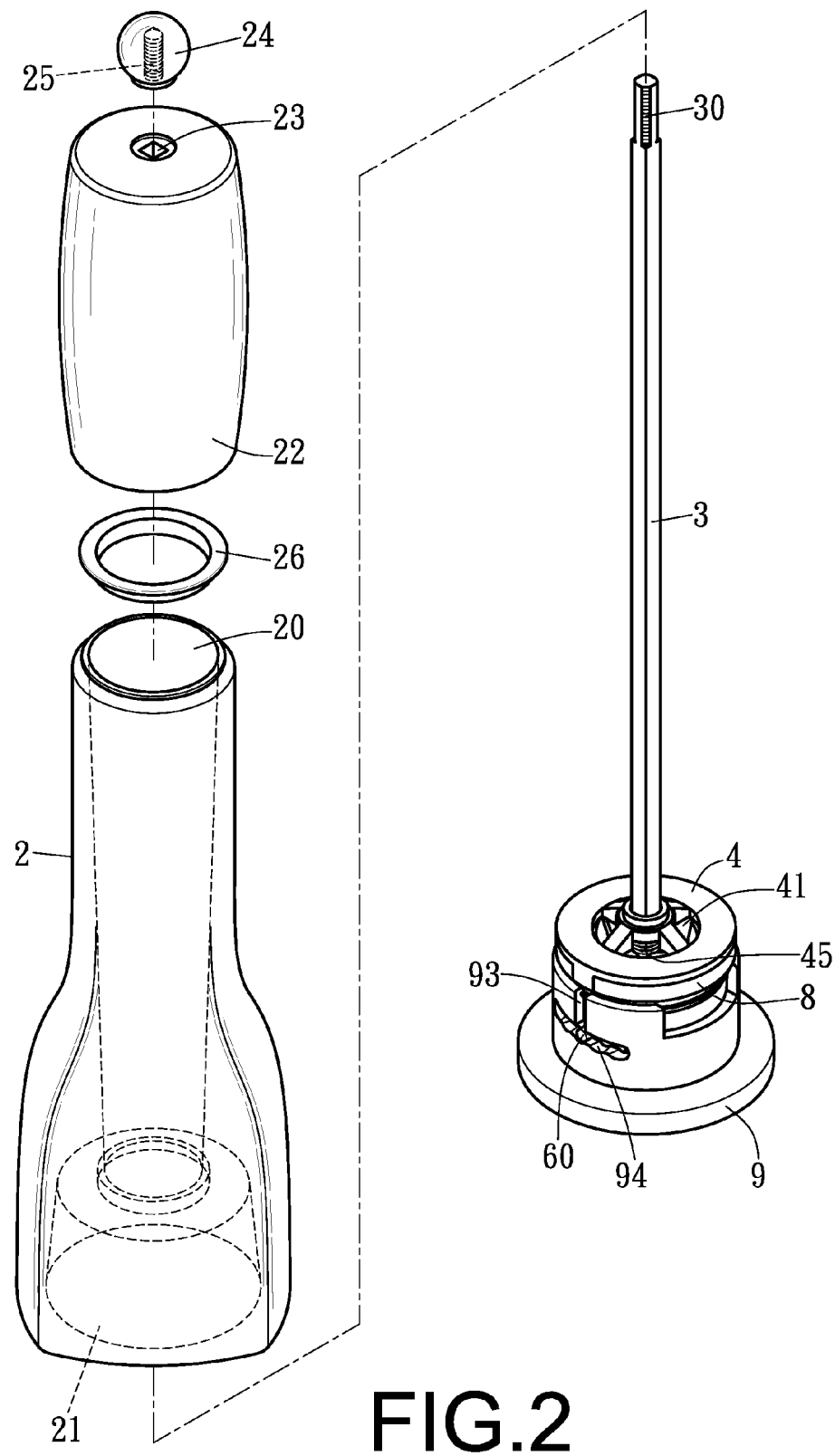
FIG. 2 is an exploded perspective view of a preferred embodiment of a mill for grinding edible particles in the present invention.
Figure 3:
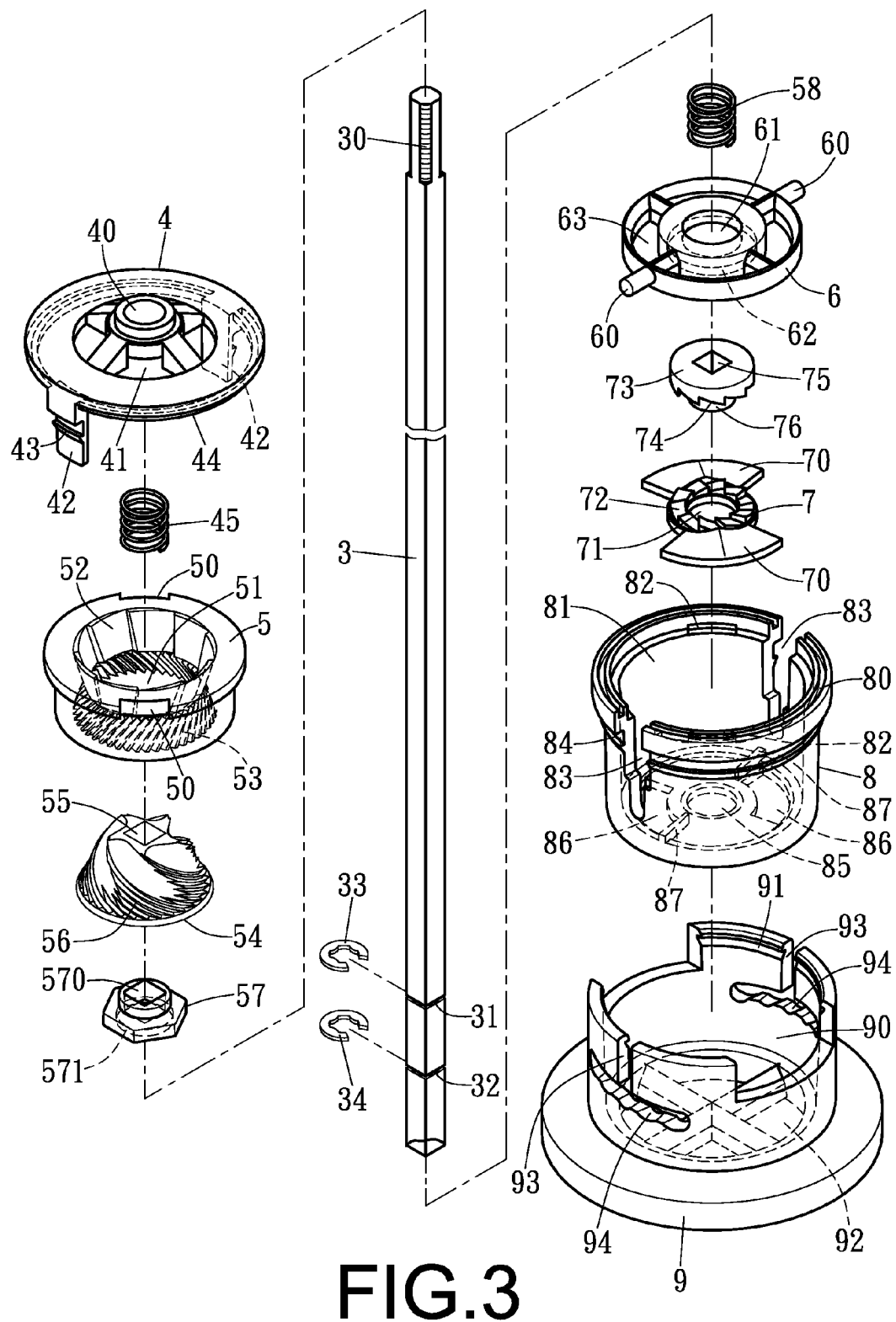
FIG. 3 is a partial exploded perspective view of the preferred embodiment of a mill for grinding edible particles in the present invention.
Figure 4:
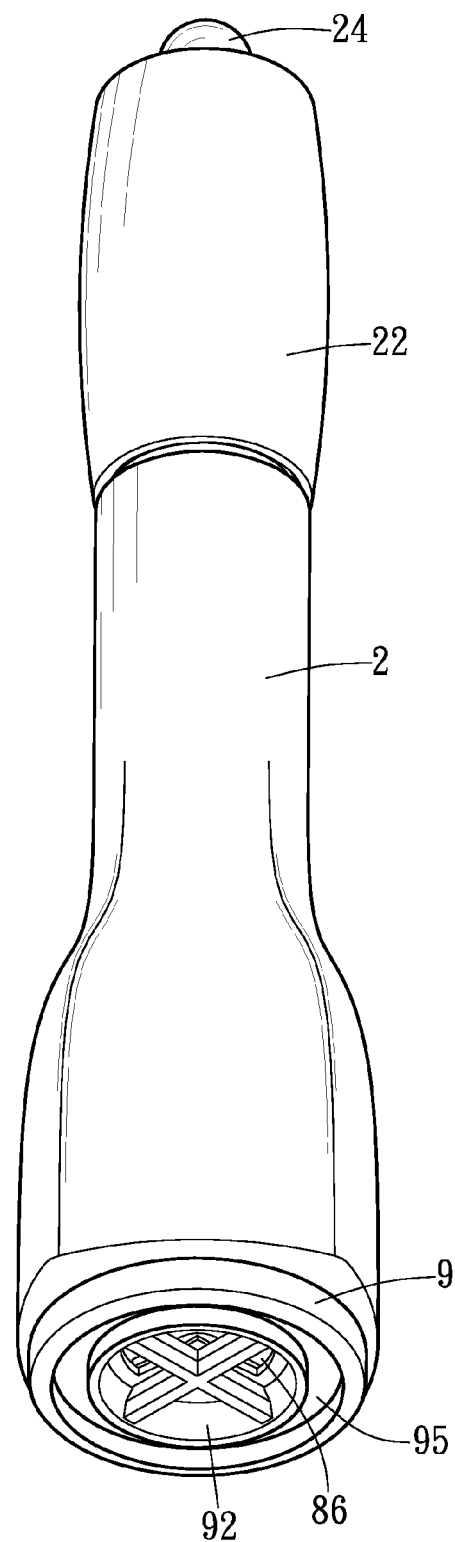
FIG. 4 is a perspective view of the preferred embodiment of a mill for grinding edible particles in the present invention.
Figure 5:
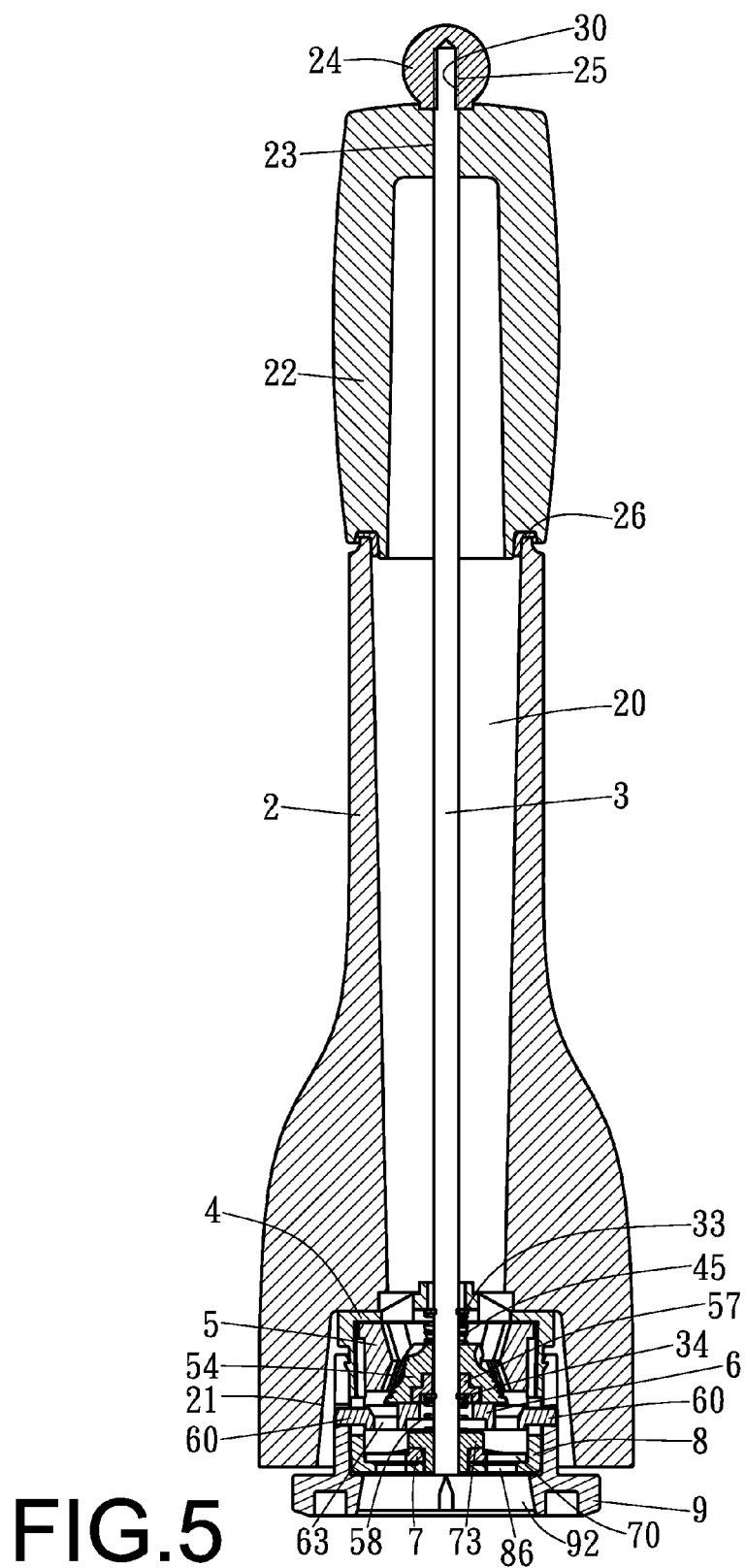
FIG. 5 is a cross-sectional view of the preferred embodiment of a mill for grinding edible particles in the present invention.
Figure 6:
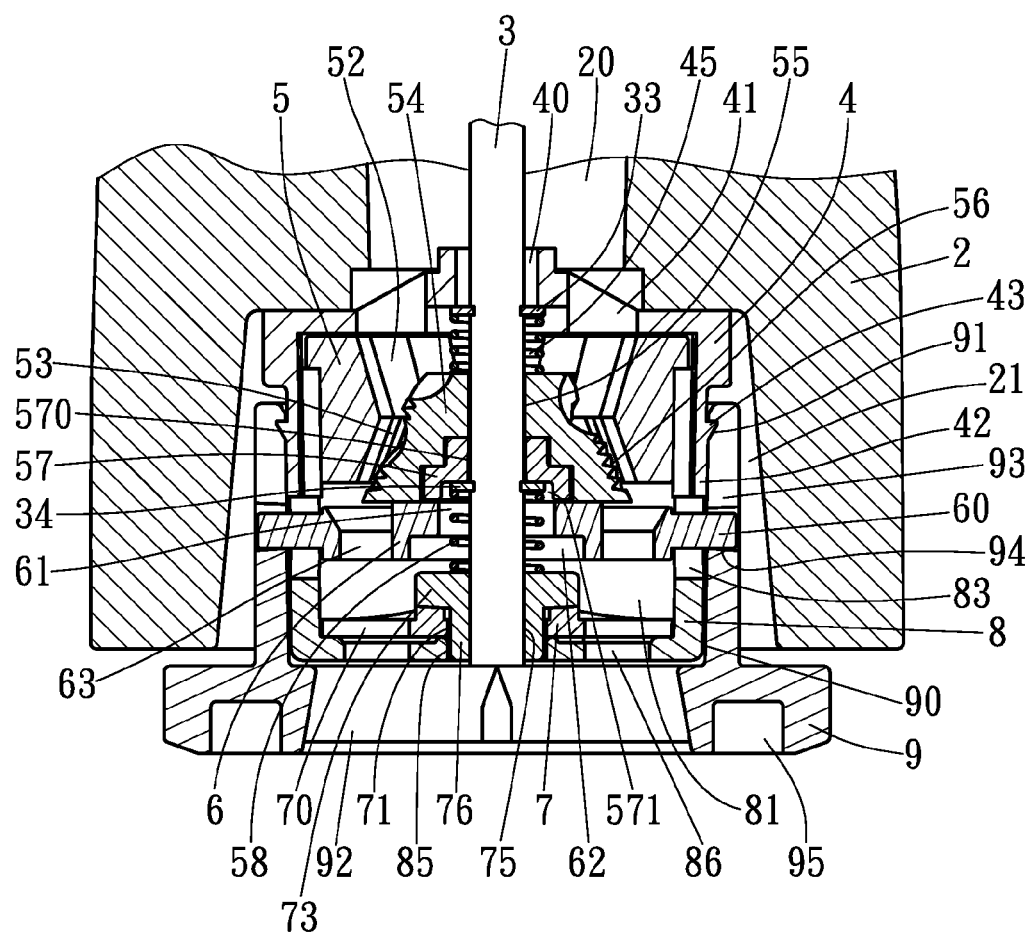
FIG. 6 is a first partial magnified cross-sectional view of the preferred embodiment of a mill for grinding edible particles in the present invention.
Figure 7:
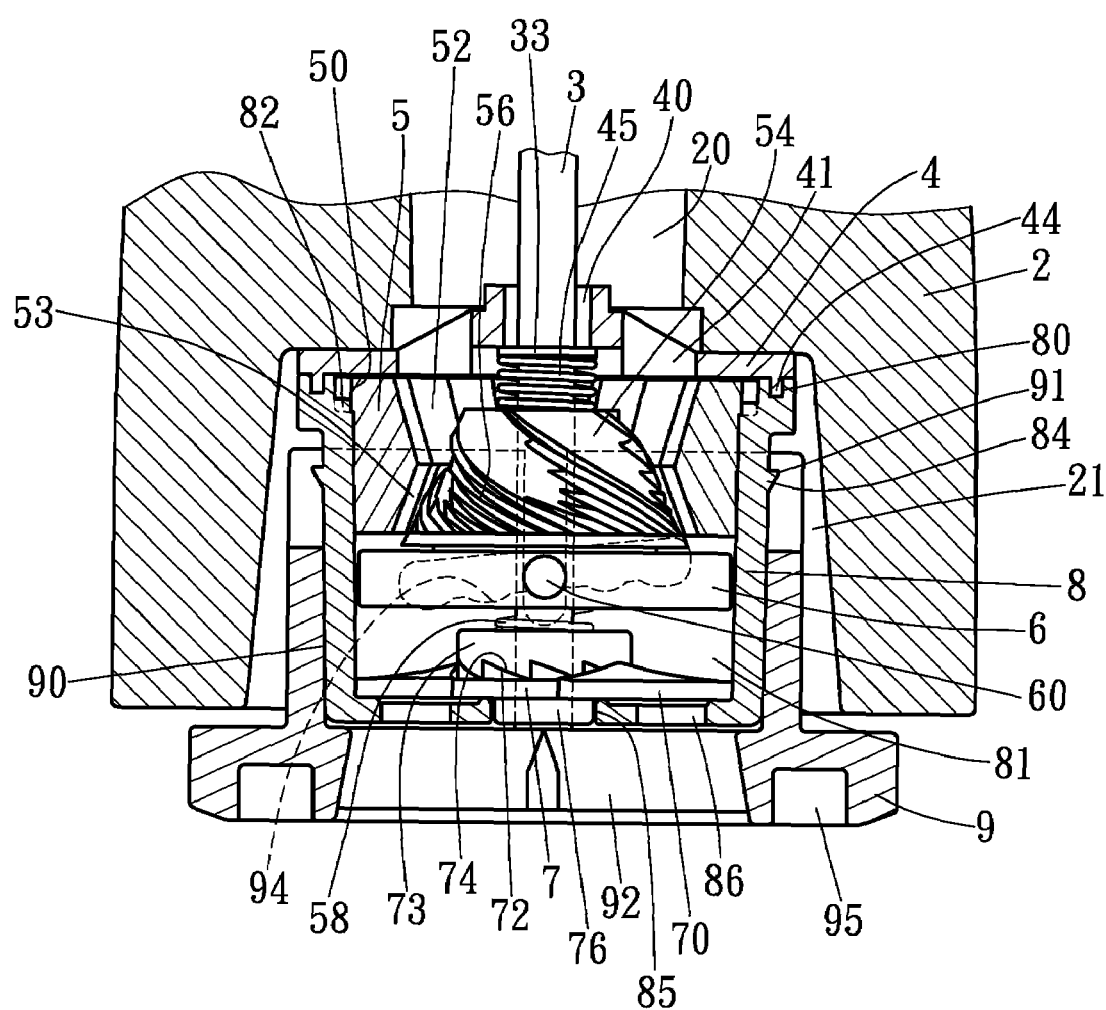
FIG. 7 is a second partial magnified cross-sectional view of the preferred embodiment of a mill for grinding edible particles in the present invention.
Figure 8:
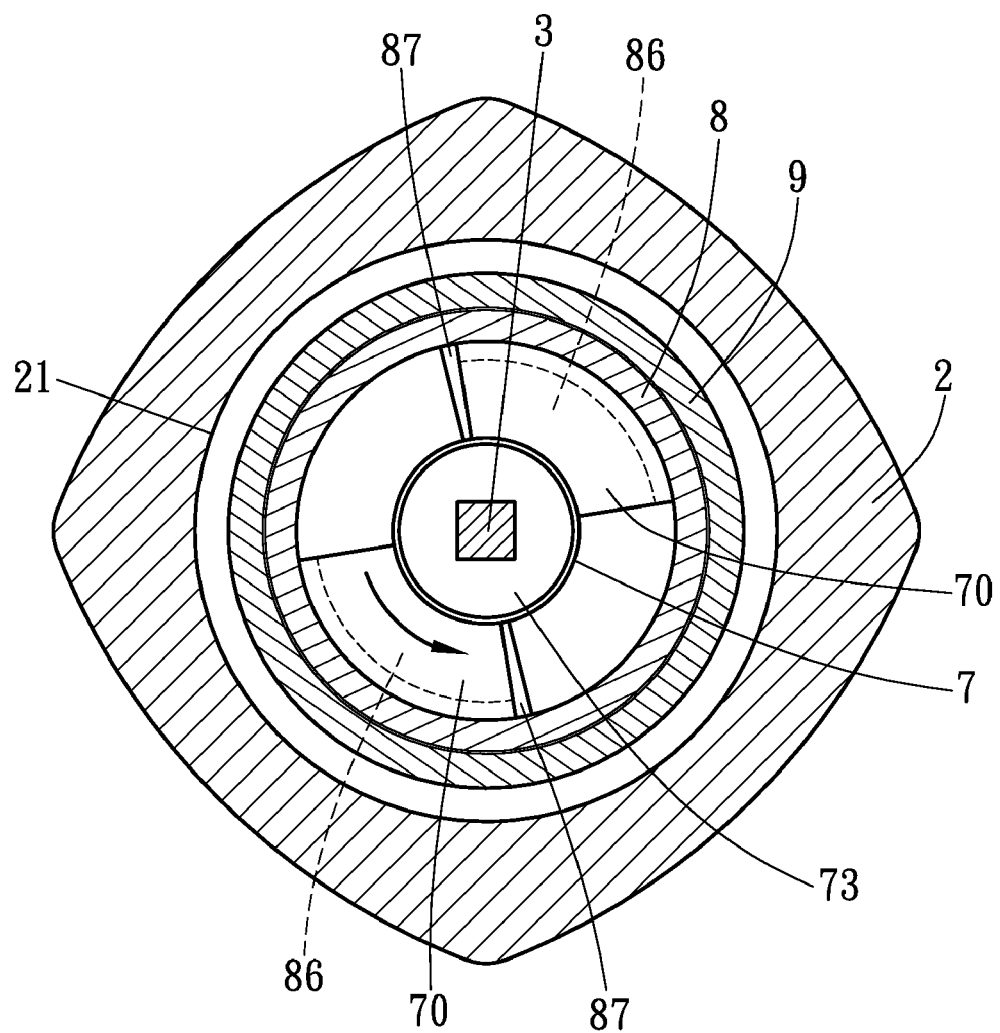
FIG. 8 is a partial cross-sectional view of the preferred embodiment of a mill for grinding edible particles in the present invention, showing powder outlets being covered by an anti-leaking cover.
Figure 9:
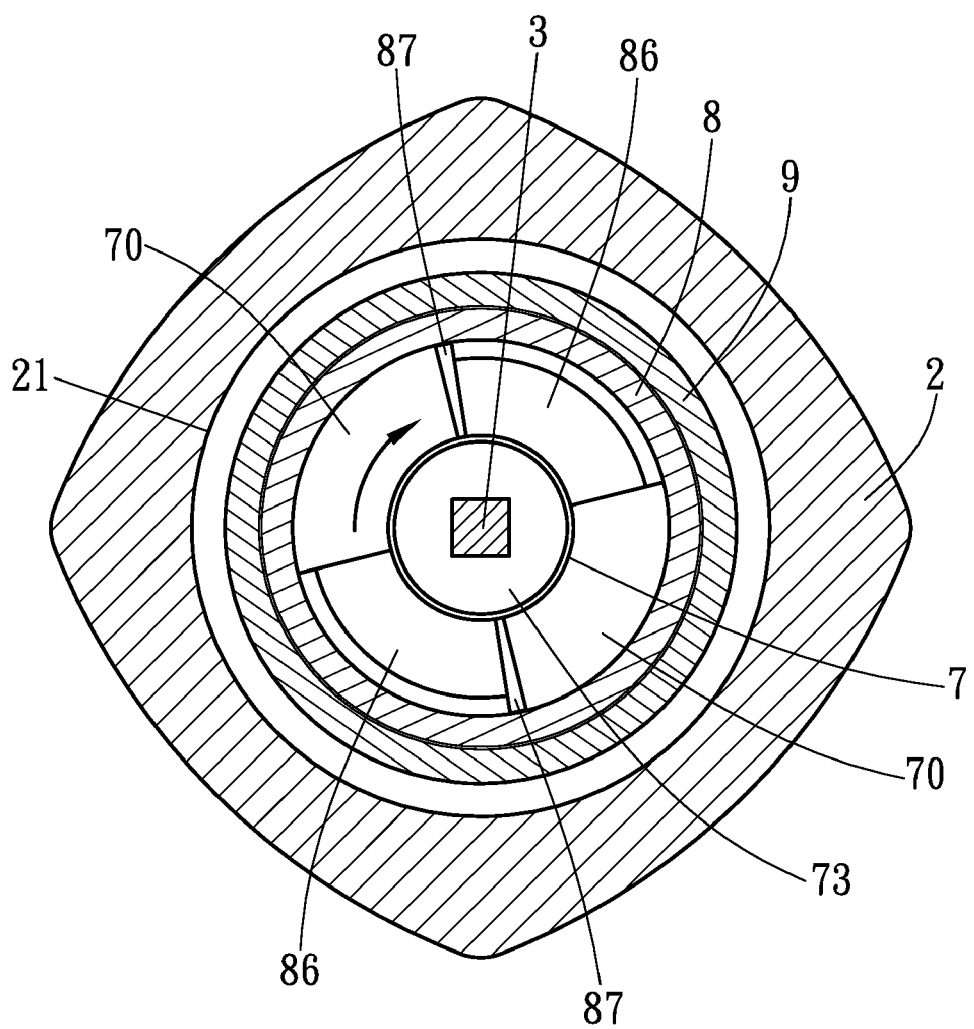
FIG. 9 is a partial cross-sectional view of the preferred embodiment of a mill for grinding edible particles in the present invention, showing the powder outlets being uncovered by the anti-leaking cover.

As shown in FIGS. 2~5, a preferred embodiment of a mill for grinding edible particles in the present invention is composed of a main body 2, a shaft 3, a cover 4, a grinding base 5, a rotator 6, an anti-leaking cover 7, a bottom base 8 and an adjustment rotating base 9.

The main body 2 is provided with a chamber 20 formed inside it, a recessed chamber 21 formed under the chamber 20, a rotating knob 22 fixed at its top, a polygonal through hole 23 bored on a top of the rotating knob 22, a positioning block 24 installed on the top of the rotating knob 22 with a threaded hole 25, and a washer 26 fixed between the rotating knob 22 and the main body 2.

The shaft 3 formed as a polygonal bar is installed inside the main body 2 and the rotating knob 22, provided with male threads 30 formed around its upper end, two annular locking slots 31 and 32 formed in its lower portion for engaging with two C-shaped locking rings 33 and 34.

The cover 4 is mounted on the shaft 3 inside the recessed chamber 21, provided with a through hole 40, plural openings 41, a pair of positioning plates 42 symmetrically extended downward from its wall with an engaging projection 43 formed on them respectively, an annular projection 44 formed at its bottom, and a spring 45 set at its bottom to be mounted on the shaft 3.

The grinding base 5 is positioned under the cover 4, provided with a pair of recessed grooves 50 symmetrically formed around its outer wall, an opening 51 bored in its center, plural slopes 52 formed around an upper inner wall of the opening 51, and plural spiral grinding teeth 53 formed around a lower inner wall of the opening 51. A grinding block 54 is installed in the opening 51 of the grinding base 5, bored with a polygonal through hole 55 in its center and formed with plural spiral grinding teeth 56 on its outer surface with a direction opposite to the spiral grinding teeth 53. Installed under the grinding block 54 is a positioning block 57 that is provided with a polygonal through hole 570, and a recess 571 formed under the polygonal through hole 570 for fitting with a spring 58.

The rotator 6 is installed under the grinding block 54, provided with a pair of bars 60 symmetrically extended from its outer wall of the rotator 6, a through hole 61 bored in its center, a recess 62 formed under the through hole 61, and plural openings 63 formed in the rotator 6.

The anti-leaking cover 7 is installed under the rotator 6, provided with a pair of covering plates 70 formed symmetrically around its circumference, a through hole 71 bored in its center, plural ratchets 72 formed around its top surface, a ratchet block 73 positioned on its top. The ratchet block 73 is formed with plural ratchets 74 at its bottom for engaging with the ratchets 72, bored with a polygonal through hole 75, and extended downward from its bottom with a projection 76 to be fitted in the through hole 71.

The bottom base 8 is positioned under the cover 4 inside the recessed chamber 21 of the main body 2, provided with an annular groove 80 formed around its top edge, a chamber 81 formed inside it, a pair of projections 82 symmetrically formed around a top edge of the chamber 81, a pair of notches 83 symmetrically cut around a wall of the bottom base 8, an annular locking edge 84 formed around an upper outer wall of the bottom base 8, a through hole 85 and two powder outlets 86 bored at a bottom of the bottom base 8, and a pair of blocking strips 87 symmetrically formed at a bottom of the chamber 81.

The adjustment rotating base 9 is fitted with the bottom base 8, provided with a chamber 90 formed inside it, a locking groove 91 formed in an upper inner wall of the chamber 90, plural openings 92 formed at a bottom of the chamber 90, a pair of notches 93 symmetrically cut around a wall of the adjustment rotating base 9, plural positioning grooves 94 with various levels slantwise formed under each of the notches 93, and an annular groove 95 formed at a bottom of the adjustment rotating base 9.

In assembling, as shown in FIGS. 2~7, the bottom base 8 is firstly placed in the chamber 90 of the adjustment rotating base 9, with the notches 83 of the bottom base 8 corresponding to the notches 93 of the adjustment rotating base 9, so as to keep the locking edge 84 engaged with the locking groove 91.

Secondly, put the ratchet block 73 on the anti-leaking cover 7, keeping the projection 76 of the ratchet block 73 inserted in the through hole 71, with the ratchets 74 of the ratchet block 73 engaged with the ratchets 72 of the anti-leaking cover 7.

Thirdly, the combination of the anti-leaking cover 7 with the ratchet block 73 is then installed in the chamber 81 of the bottom base 8 to keep the projection 76 of the ratchet block 73 positioned in the through hole 85 of the bottom base 8. By the time, the powder outlets 86 of the bottom base 8 are covered by the covering plates 70 of the anti-leaking cover 7.

Fourthly, the rotator 6 is set in the chamber 81 of the bottom base 8 to enable the bars 60 of the rotator 6 fitted in the notches 83 of the bottom base 8 and to rest on one of the positioning grooves 94.

Fifthly, the spring 58 is mounted around the shaft 3 that is further inserted through the through hole 61 of the rotator 6 and the polygonal through hole 75 of the ratchet block 73, and then the annular locking slot 32 is engaged with the annular locking ring 34, so as to keep the spring 58 constricted between the annular locking ring 34 and the ratchet block 73.

Sixthly, the positioning block 57 and the grinding block 54 are then sequently penetrated by the shaft 3 via the polygonal through holes 570 and 55 of the positioning block 57 and the grinding block 54 respectively.

Seventhly, the grinding base 5 is placed in the chamber 81 of the bottom base 8 to rest outside the grinding block 54 with the projections 82 of the bottom base 8 inserted into the recessed grooves 50 of the grinding base 5.

Eighthly, the spring 45 is mounted around the shaft 3, and then the annular locking slot 31 is engaged with the annular locking ring 33, so as to keep the spring 45 constricted between the annular locking ring 33 and the grinding block 54.

Ninthly, the cover 4 is put on the bottom base 8, keeping the positioning plates 42 engaged with the notches 83 of the bottom base 8, the annular projection 44 engaged with the annular groove 80, and the engaging projections 43 of the positioning plates 42 fitted in the locking groove 91, for stably fixing the cover 4 on the bottom base 8.

Finally, the whole assembly of the components mentioned above is inserted in the recessed chamber 21 of the main body 2 by passing the shaft 3 through the chamber 20 of the main body 2 and the polygonal through hole 23 of the rotating knob 22 orderly. And, via engaging the male threads 30 of the shaft 3 with the threaded hole 25 of the positioning block 24, the shaft 3 is fixed with the positioning block 24, finishing assembling In using, as shown in FIGS. 5~9, when edible particles such as those of pepper are to be ground, they are first put into the chamber 20 of the main body 2. Next, turn around the rotating knob 22 of the main body 2 clockwise so as to sequently drive the shaft 3, the grinding block 54, the positioning block 57 and the ratchet block 73 to spin as well. By the time, the particles staying between the grinding base 5 and the grinding block 54 are to be ground finer by the plural spiral grinding teeth 56 of the grinding block 54 and the plural spiral grinding teeth 53 of the grinding base 5. And, as the anti-leaking cover 7 is driven by the ratchet block 73 to rotate, the covering plates 70 are consequently turned around to move away from the powder outlets 86. However, as soon as the covering plates 70 of the anti-leaking cover 7 is moved to contact with the blocking strips 87, the anti-leaking cover 7 is to be stopped by the blocking strips 87. It should be noted that as the anti-leaking cover 7 is engaged with the ratchet block 73 merely by means of the contact between the single slopes of the ratchets 72 and those of the ratchets 74, the ratchet block 73 can keep on rotating on the anti-leaking cover 7. And, being elastically squeezed by the spring 58, the ratchet block 73 is to jumpily move on the anti-leaking cover 7. With the powder outlets 86 of the bottom base 8 uncovered by the covering plates 70, the ground powder can sequentially drop down from the powder outlets 86 and the openings 92 of the adjustment rotating base 9 for use.

When the mill is no longer to be used, a user just has to turn around the rotating knob 22 counterclockwise to sequentially drive the shaft 3, the grinding block 54, the positioning block 57 and the ratchet block 73 to rotate in the same direction. By the time, as the vertical surfaces of the ratchets 74 of the ratchet block 73 are contacting with those of the ratchets 72 of the anti-leaking cover 7, the anti-leaking cover 7 can be also activated to move counterclockwise, thus enabling the covering plates 70 of the anti-leaking cover 7 to rest on the powder outlets 86 again to prevent the powder from dropping out of the powder outlets 86. So, the powder remained inside the mill will not drop on the table while the mill is put on the table without being used.

Figure 10:
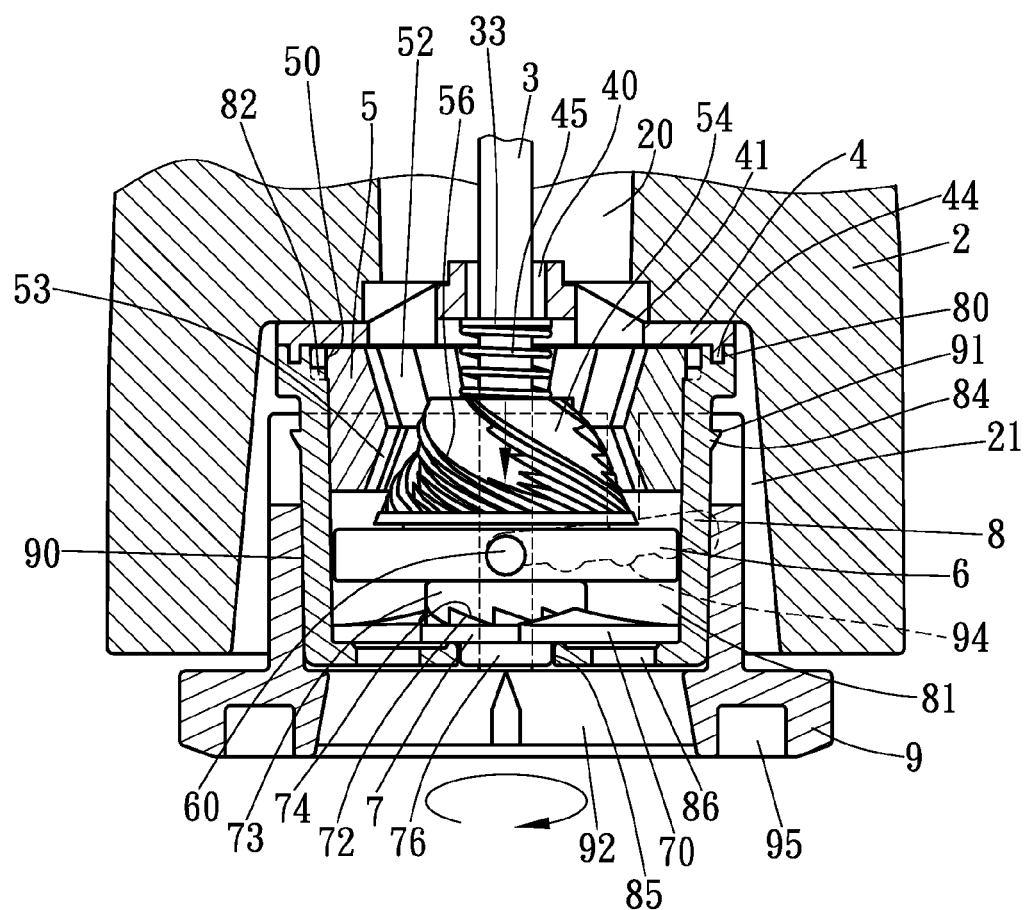
FIG. 10 is a partial cross-sectional view of the preferred embodiment of a mill for grinding edible particles in the present invention, showing a distance between a grinding block and a grinding base being altered by turning around an adjustment rotating base.

As shown in FIG. 10, a user only has to turn around the adjustment rotating base 9 to keep the bars 60 of the rotator 6 moved in the positioning grooves 94 of the adjustment rotating base 9, so as to obtain diverse sizes of powder. If coarser powder is needed, the adjustment rotating base 9 must be whirled to make the positioning grooves 94 at lower levels corresponding to the bars 60 and by the time, the rotator 6 and the grinding block 54 are elastically compressed downward by the spring 45 to keep the bars 60 of the rotator 6 positioned in the positioning grooves 94 at the lower levels, thus providing a wider distance between the grinding block 54 and the grinding base 5 to gain coarser powder. On the contrary, if finer powder is preferred, the adjustment rotating base 9 must be conversely whirled to make the positioning grooves 94 at higher levels corresponding to the bars 60 and by the time, the rotator 6 is moved upwardly to push up the grinding block 54 to compress the spring 45 to keep the bars 60 of the rotator 6 positioned in the positioning grooves 94 at the higher levels, thus providing a narrower distance between the grinding block 54 and the grinding base 5 to gain finer powder.

While the preferred embodiment of the invention has been described above, it will be recognized and understood that various modifications may be made therein and the appended claims are intended to cover all such modifications that may fall within the spirit and scope of the invention.

What is claimed is:

1. A mill for grinding edible particles, said mill comprising:
    a main body provided with a chamber formed inside it, a recessed chamber formed under said chamber, a rotating knob fixed on a top of said main body, a polygonal through hole bored on a top of said rotating knob, a positioning block installed on said top of said rotating knob, and a washer fixed between said rotating knob and said main body;
    a shaft installed inside said main body and said rotating knob, said shaft formed as a polygonal bar and provided with two annular locking slots formed in its lower portion for engaging with locking rings;
    a cover mounted on said shaft inside said recessed chamber of said main body and provided with a through hole and plural openings, a pair of positioning plates symmetrically extended downward from a wall of said cover with an engaging projection formed thereon respectively, and a spring set at a bottom of said cover to be mounted on said shaft;
    a grinding base positioned under said cover and provided with a pair of recessed grooves symmetrically formed around its outer wall, an opening bored in a center of said grinding base, plural slopes formed around an upper inner wall of said opening, and plural spiral grinding teeth formed around a lower inner wall of said opening, a grinding block installed in said opening and bored with a polygonal through hole in its center and formed with plural spiral grinding teeth on its outer surface with a direction opposite to said spiral grinding teeth, a positioning block installed under said grinding block and provided with a polygonal through hole and a recess formed under said polygonal through hole for fitting with a spring;
    a rotator installed under said grinding block and provided with a pair of bars symmetrically extended from its outer wall, a through hole bored in a center of said rotator, a recess formed under said through hole, and plural openings formed in said rotator;
    an anti-leaking cover installed under said rotator and provided with a pair of covering plates formed symmetrically around its circumference, a through hole bored in a center of said anti-leaking cover, plural ratchets formed around a top surface of said anti-leaking cover, a ratchet block positioned on a top of said anti-leaking cover, said ratchet block formed with plural ratchets around its bottom for corresponding to said ratchets of said anti-leaking cover and bored with a polygonal through hole in its center and extended downward from its bottom with a projection to be fitted in said through hole of said anti-leaking cover;

a bottom base positioned under said cover inside said recessed chamber of said main body and provided with a chamber formed inside it, a pair of projections symmetrically formed around a top edge of said chamber, a pair of notches symmetrically cut around a wall of said bottom base, an annular locking edge formed around an upper outer wall of said bottom base, a through hole and plural powder outlets bored at a bottom of said bottom base, and a pair of blocking strips symmetrically formed at a bottom of said chamber; and an adjustment rotating base fitted with said bottom base and provided with a chamber formed inside it, a locking groove formed in an upper inner wall of said chamber, plural openings formed at a bottom of said chamber, a pair of notches symmetrically cut around a wall of said adjustment rotating base, plural positioning grooves with various levels slantwise formed under each of said notches.

2. The mill for grinding edible particles as claimed in claim 1, wherein said positioning block of said main body is provided with a threaded hole for engaging with male threads formed around a top end of said shaft.

3. The mill for grinding edible particles as claimed in claim 1, wherein said cover is provided with an annular projection formed at its bottom for engaging with an annular groove formed around a top edge of said bottom base.

\* \* \* \* \*